United States Patent [19]
Auvil et al.

[11] Patent Number: 5,306,331
[45] Date of Patent: Apr. 26, 1994

[54] PROCESS FOR COOLING THE FEED GAS TO GAS SEPARATION SYSTEMS

[75] Inventors: Steven R. Auvil, Macungie, Pa.; Rodney J. Allam, Guildford, England; Paul A. Webley, Macungie, Pa.; Philip J. Young, Whitchurch, England

[73] Assignee: Permea, Inc., St. Louis, Mo.

[21] Appl. No.: 32,885

[22] Filed: Mar. 18, 1993

[51] Int. Cl.⁵ .................................. B01D 53/22
[52] U.S. Cl. ......................... 95/42; 95/45; 95/47; 95/54; 95/92; 95/130; 95/187; 95/227; 95/228; 95/288
[58] Field of Search ............... 95/39, 42, 43, 45, 47, 95/54, 92, 130, 187, 227, 228, 288

[56] References Cited

U.S. PATENT DOCUMENTS

| | | | |
|---|---|---|---|
| 2,497,421 | 2/1950 | Shiras | 95/42 |
| 3,445,990 | 5/1969 | Hays et al. | 55/58 |
| 4,078,390 | 3/1978 | Duvall | 95/42 X |
| 4,144,037 | 3/1979 | Armond et al. | 95/130 X |
| 4,264,338 | 4/1981 | Null | 55/16 |
| 4,287,138 | 9/1981 | Buckner | 95/187 X |
| 4,474,586 | 10/1984 | Rice | 55/16 |
| 4,545,787 | 10/1985 | Hegarty | 95/54 X |
| 4,560,394 | 12/1985 | McDonald et al. | 95/54 |
| 4,675,030 | 6/1987 | Czarnecki et al. | 95/39 |
| 4,681,602 | 7/1987 | Glenn et al. | 95/47 |
| 4,687,498 | 8/1987 | Maclean et al. | 95/130 X |
| 4,765,804 | 8/1988 | Lloyd-Williams et al. | 95/54 |
| 4,781,907 | 11/1988 | McNeill | 95/54 X |
| 4,787,919 | 11/1988 | Campbell et al. | 55/16 |
| 4,881,953 | 11/1989 | Prasad et al. | 95/54 X |
| 5,090,971 | 2/1992 | Barbier | 95/45 |
| 5,169,412 | 12/1992 | Prasad et al. | 95/47 |
| 5,207,806 | 5/1993 | Lagree et al. | 95/47 X |

Primary Examiner—Robert Spitzer

[57] ABSTRACT

The present invention provides a process for utilizing one stream from a gas separation unit in an evaporation cooler to provide cool water which is used to cool the feed gas mixture by direct or indirect contact prior to entering the gas separation unit.

49 Claims, 14 Drawing Sheets

PROCESS FOR COOLING THE FEED GAS TO GAS SEPARATION SYSTEMS

FIELD OF THE INVENTION

Molecular separation systems have been used to separate a mixture of gases into its several components. Examples of separation systems include membrane based systems, molecular sieve systems, such as pressure swing adsorption systems, and the like.

The present invention relates to a process for cooling the feed gas utilized in gas separation systems. More particularly, the present invention relates to a process for producing, in a highly-effective and efficient manner, a relatively pure gas from a gaseous mixture.

BACKGROUND OF THE INVENTION

Membranes have been employed which use the principle of selective permeation to separate mixtures of gases into their components. Each gas has a characteristic permeation rate that is a function of its ability to dissolve into and diffuse into a given membrane or molecular sieve. Typically, membranes are produced as either flat sheets or as hollow fibers. Flat sheets are usually employed in spiral wound separators while hollow fibers are employed in shell and tube type separators. Other innovative configurations employing flat sheet or hollow fiber membranes are also available.

In a bundle of hollow fiber membranes positioned by various means and orientations within an elongated shell, one or more gases are separated from a mixture of gases by allowing the gases to permeate selectively through the membrane. For example, relatively pure nitrogen can be made from air by feeding compressed air into one end of an elongated container filled with a plurality of juxtaposed axially hollow fiber membranes running longitudinally of the container. The feed can enter the bores of the fibers or the outside of the fibers. Oxygen, carbon dioxide, water and other gases will permeate through the membrane fibers, but nitrogen permeates at a much slower rate. The gases passing through the membrane and separated from the mixture of gases are withdrawn from the low pressure side of the membrane. The portion of the air which does not permeate the membrane fibers after contact with the active membrane surface is relatively pure nitrogen. Generally, the nitrogen gas will have a small amount of oxygen. Most mixtures of gases, such as air, contain some water vapor. The amount of water vapor in the gas is typically characterized by the dew point temperature of the gas mixture. The dew point is the temperature at which water will begin condensing from the gas mixture at its pressure. Water vapor successfully passes through the membrane fibers but condensed water has a tendency to clog the pores of the membrane fibers. For this reason, h is highly desirable to operate the membrane at a temperature which is a few degrees above the dew point of the feed.

Conventional membrane separation of air into its components involves compressing air, then passing the air through an aftercooler to remove the heat of compression. Water or air cooled aftercoolers generally cool the gas to about 35° C. or higher, and at or near its dew point. If the compressed gas is cooled below its dew point in the aftercooler, water vapor will condense from the gas. These condensates are removed before further processing.

To minimize moisture condensation in the membrane, one approach has been to preheat the feed to the membrane system to above its dewpoint, and then to insulate the individual membrane modules, thereby retaining the heat in the modules. Thus, the membrane operates above the dewpoint of the feed stream and condensation in the membrane is avoided. Heating of the feed gas is typically effected from external sources such as electrical heaters. Alternatively, the membrane modules themselves can be enclosed in an insulated heated container which keeps the membrane modules at a temperature above the dewpoint of the feed gas. Thus, saturated feed air at a lower temperature may be fed to the membrane modules without condensation of the moisture on the membrane surface. While both approaches and combinations thereof, avoid condensation in the membrane, the membranes operate at elevated temperatures. This introduces an inefficiency in the separation process since the ability of a membrane to separate gases typically increases as the temperature is lowered.

In attempts to predry the feed stream to permit the membrane to be operated at lower temperatures, refrigerated dryers and adsorbent beds have been used to lower the dewpoint of the feed gas below the desired operating temperature of the membrane unit. A refrigerated dryer provides a cooled, low dew point gas stream to feed to the membrane unit; however, the capital and operating costs associated with a refrigerated dryer are quite high, and, also, the refrigerated dryer involves the use of environmentally undesirable compounds such as freon refrigerants. When an adsorbent bed is used to remove water, the gas is not cooled, and, thus, the problems of high feed temperature prevail. In addition, some means of regenerating the adsorbent bed material must be provided.

In a typical membrane-based air separation system, a number of individual membrane modules or separators may be employed. In addition, these separators may be arranged to operate in parallel, in series, or a combination thereof. When a series arrangement is employed, a variety of recycle schemes can be employed to improve the overall efficiency of the system. For example, when air is the feed gas, the optimum configuration is dependent on the desired purity of the enriched nitrogen and/or oxygen streams, flow rates, and economic considerations.

Adsorption-based air separation systems typically employ carbon molecular sieves or zeolftes. Systems using carbon molecular sieves make use of the fact that oxygen molecules diffuse into the material much faster than nitrogen. Systems using zeolites rely on the fact that these materials have a much greater affinity for nitrogen than for oxygen. Cycles and operating conditions can be selected for either system to provide for the efficient production of high purity oxygen and/or nitrogen. Cyclic systems which operate between high pressure and atmospheric pressure (as in nitrogen PSA generators) or sub-atmospheric pressure (as in oxygen VSA generators) may be employed to provide the driving force for the separation. In either case (PSA or VSA), the operation is referred to as pressure swing adsorption (PSA) hereinafter.

Because the efficiencies of carbon molecular sieves and zeolite adsorbents to separate air are reduced by any moisture present in the feed air, prebeds containing adsorbents which reversibly bind water and/or refrigerated dryers, are used to reduce or eliminate the moisture contained in the feed gas. The refrigerated dryer is generally used where the optimum or preferred feed gas temperature is below that which can be achieved by heat exchange with available cooling tower water or ambient air. High capital and operating costs associated with refrigerated dryers plus the fact that they use environmentally undesirable compounds, such as freon refrigerants, however, limit their use in these applications.

The present invention provides a process for cooling the feed gas to a suitable temperature to optimize the performance of gas separation systems. The process is free of the limitations present in refrigerated dryers and adsorption drying processes.

SUMMARY OF THE INVENTION

The process is an efficient and economical process for cooling the feed gas to a gas separation system. It is known that gas separation in membrane-based systems and pressure swing adsorption systems is more efficient when the feed gas is cooled following compression.

The heat of compression is substantial, and, therefore, d is necessary to provide a cooling means which is efficient and cost effective. The cooling means of the present invention is derived from a low dewpoint recycle stream. Recognizing that the dewpoints of the permeate and non-permeate streams are both below that of the feed to the membrane, portions of either or both streams can be used as the recycle stream. If the non-permeate stream is the product stream, then the permeate stream is typically used to recycle through a cooling column to provide a cooling means. If the permeate stream is the product stream, then the non-permeate stream is used typically to provide a cooling means by recycle to an evaporative cooling column. An evaporative cooling means, which may be in the form of a cooling column, utilizes the recycle gas stream from the membrane to cool water through evaporation. The cooled water is then used as the cooling means to further cool the compressed gas prior to entry into the membrane unit.

The present invention provides a process for the separation of at least one gas of a feed gas having a mixture of gases, from at least one other gas of the feed gas mixture. The process utilizes a gas separation unit which produces a high pressure stream and a low pressure stream. One stream from the separation unit is utilized to cool water by evaporation. The feed gas mixture is then cooled by direct or indirect contact with the cooled water. The other stream typically is recovered as a product stream enriched in the at least one gas.

For example, the process may be used to separate air into oxygen and nitrogen rich streams. This process compresses the feed gas, passes the compressed feed gas into a gas separation unit to separate the gas into a permeate stream enriched in the more permeable gases and a non-permeate stream enriched in the less permeable gases, and then uses either stream to cool water by evaporation. The stream used to cool water by evaporation depends on the particular application and operating conditions. This cooled water is utilized to cool the compressed feed gas prior to entry into the gas separation unit. For instance, the low dewpoint membrane permeate gas from a membrane gas separation unit is used to cool water by evaporation, and then the membrane feed gas is cooled by direct or indirect contact with the cooled water. After the feed gas has been cooled and the condensate removed, the feed gas typically is slightly reheated to above its dewpoint by electrical heat, indirectly with a hot fluid such as steam, or cross-exchanging with the compressed air before it enters or after it leaves the aftercoolers or combinations thereof. In other applications, the non-permeate stream may be used as the cooling stream.

More specifically, one embodiment of the present invention utilizes a compressor to compress the gas to a pressure of at least about 11 bar. The gas is fed to aftercoolers to remove the heat of compression. Condensate and any oil from the compressor are removed in separators and coalescing filters. The pressurized gas is then cooled, condensates are removed, and the gas is slightly heated to a temperature somewhat above its dewpoint to prevent condensation in the membrane unit. The gas is then passed through a membrane unit.

To cool the gas prior to entering the membrane unit, cooling columns are used which are typically a gas/liquid contacting device such as a packed, trayed, or spray tower. In packed towers, the gas and liquid are brought into contact by passing countercurrently over the surface provided by random packings, such as Pall rings, Berl saddles, etc. or structured packings such as those provided by Nutter Engineering. Trayed towers may contain trays such as those typically used in distillation, e.g., sieve, valve, and bubble-cap trays, to contact the gas and liquid. In a spray tower, the gas can move cocurrent or countercurrent to a spray of water. The fine droplets of water provide the high surface area for gas/liquid contacting.

Variations of this system may be utilized but still lie within the scope of the present invention.

DETAILED DESCRIPTION OF THE INVENTION

Figure 1:
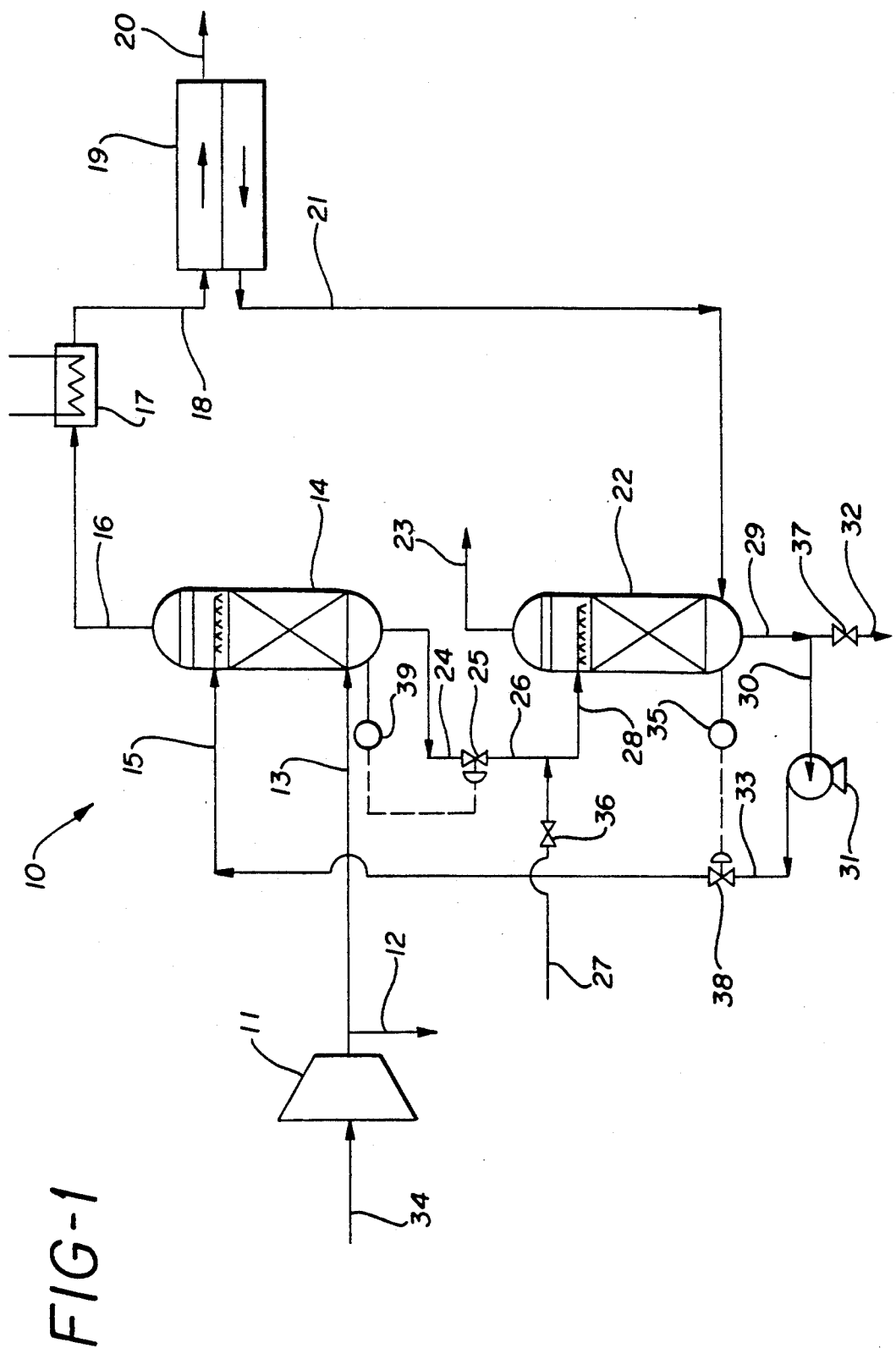
FIG. 1 is a schematic for one embodiment of the present invention.

FIG. 1 represents a schematic of one embodiment of the present invention. The system 10 commences with air 34 being fed into a compressor 11 which has an aftercooler followed by coalescing filters. The condensate 12 formed after compression and cooling of the gas is removed. The compressed, generally saturated air 13 is passed to a high-pressure column 14, wherein the pressurized gas is cooled by direct contact with cool water, and passed through a conduit 16 to a heater 17. The heater 17 heats the gas to a few degrees, typically 2°-10° C. above its dewpoint. The heated gas is passed through a conduit 18 to a membrane gas separation unit 19. The gas is separated by the membrane unit 19 into a non-permeate product stream 20 and a permeate stream 21. In this instance, the non-permeate stream is a high purity nitrogen, substantially dry gas stream. The permeate stream contains oxygen, argon, nitrogen, water and carbon dioxide and some portions of the other components and the contaminants present in the feed air. The permeate stream 21 is carried to a low-pressure column 22, whereupon the low dewpoint permeate stream cools water by evaporation in the column. The water is provided from the column 14 through a conduit 24, and the entry of the water is controlled by a valve 25 through a conduit 26. A make-up water stream 27 is controlled by a valve 36 and enters the water stream 28. The water stream 28 is the cooled water source entering the low pressure column 22. Exiting from the column 22 is a water stream 29 which has been substantially cooled and an effluent gas stream 23. The water stream 29 is pumped through a conduit 30 by means of a pump 31, and is controlled by a valve 38 in a conduit 33 that is directed as a stream 15 to the first high-pressure column 14. This cooled water 15 provides the cooling for the compressed gas 13 in the column 14. At the base of the column 22, there is a blow-down valve 37, allowing excess water and any contaminates to be purged 32 from the system. Level controls 35 and 39 are provided for the columns 22 and 14, respectively.

Figure 2:
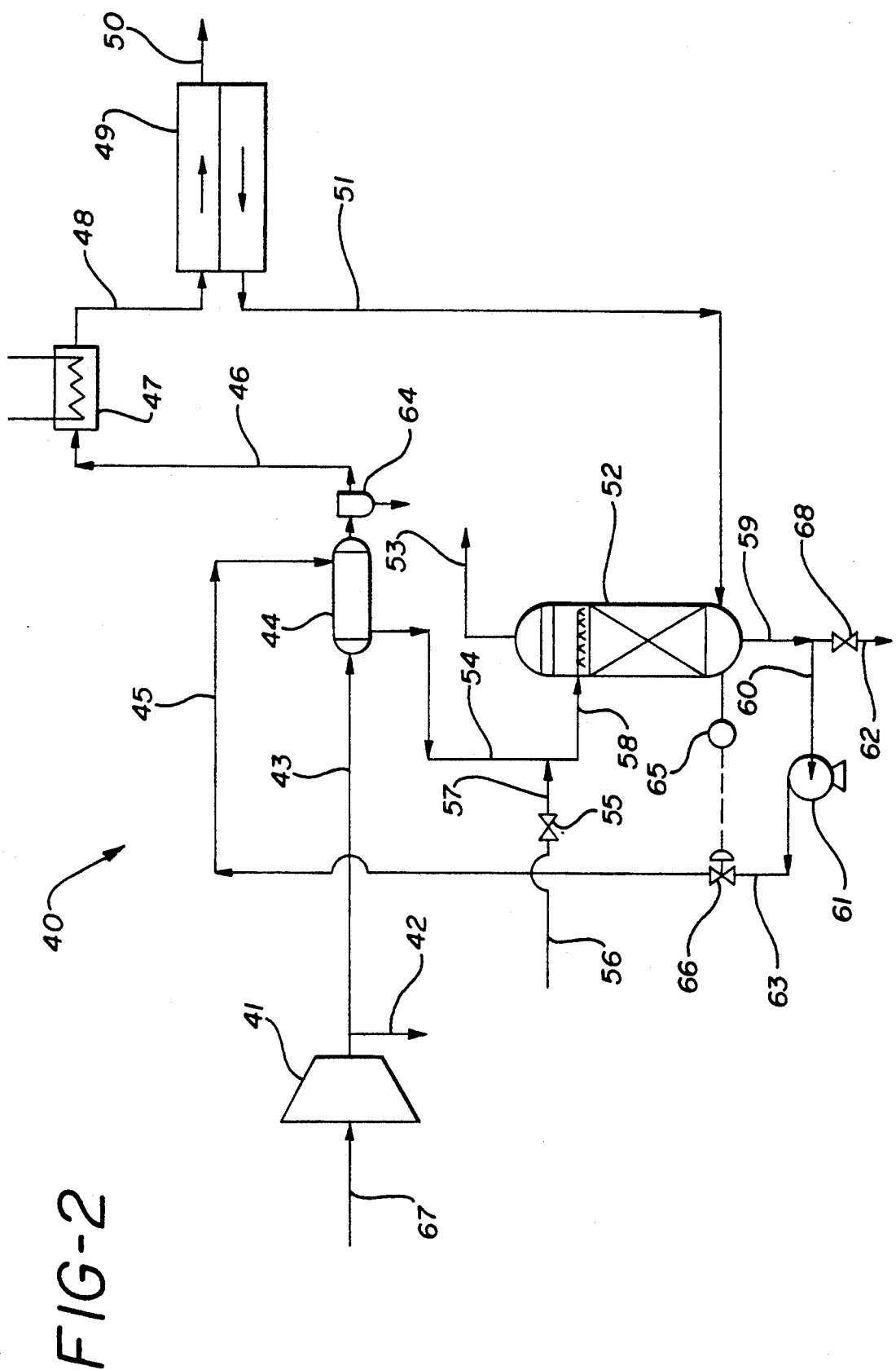
FIG. 2 is a schematic for another embodiment of the present invention.

FIG. 2 illustrates a system 40, wherein instead of two cooling columns, a heat exchanger is used to cool the feed gas by indirect contact with the cooled water. Specifically, a feed gas 67, generally air, enters the compressor 41, followed by the aftercooler and the coalescing filters to provide a condensate 42, which is removed. The pressurized feed gas 43 then passes through a heat exchanger 44, which is cooled by water 45, and from which water 54, heated from cooling the gas, is removed and sent through a conduit 58 to a low-pressure evaporating column 52, which cools the water 58 and provides cooled water 59, which is sent through a conduit 60, a pump 61, and a conduit 63. A valve 66 controls the flow of the water, and is associated with a level control 65, which operates a valve 66. The cooled water 45 then passes to the heat exchanger 44 to complete the circuit. The effluent gas 53 is either vented to the atmosphere or is recovered for other purposes. A make-up water system is fed by a line 56 through a valve 55, and then through a line 57 to enter the water stream being fed to the cooling column 52. Any condensate generated by cooling the compressed feed gas in the heat exchanger is condensed and removed. The compressed cooled gas exiting the heat exchanger 44 and condenser 64 passes through a conduit 46 into a heater 47. The gas is heated to a few degrees above its dewpoint. The heated gas 48 then enters a membrane-separator unit 49, which separates the gas into a non-permeate stream 50 and a permeate stream 51. The permeate stream 51 then is fed to the low-pressure column 52 for the evaporative cooling process. Associated with the low-pressure column 52 is a blow-down line 62, controlled by a valve 68.

Figure 3:
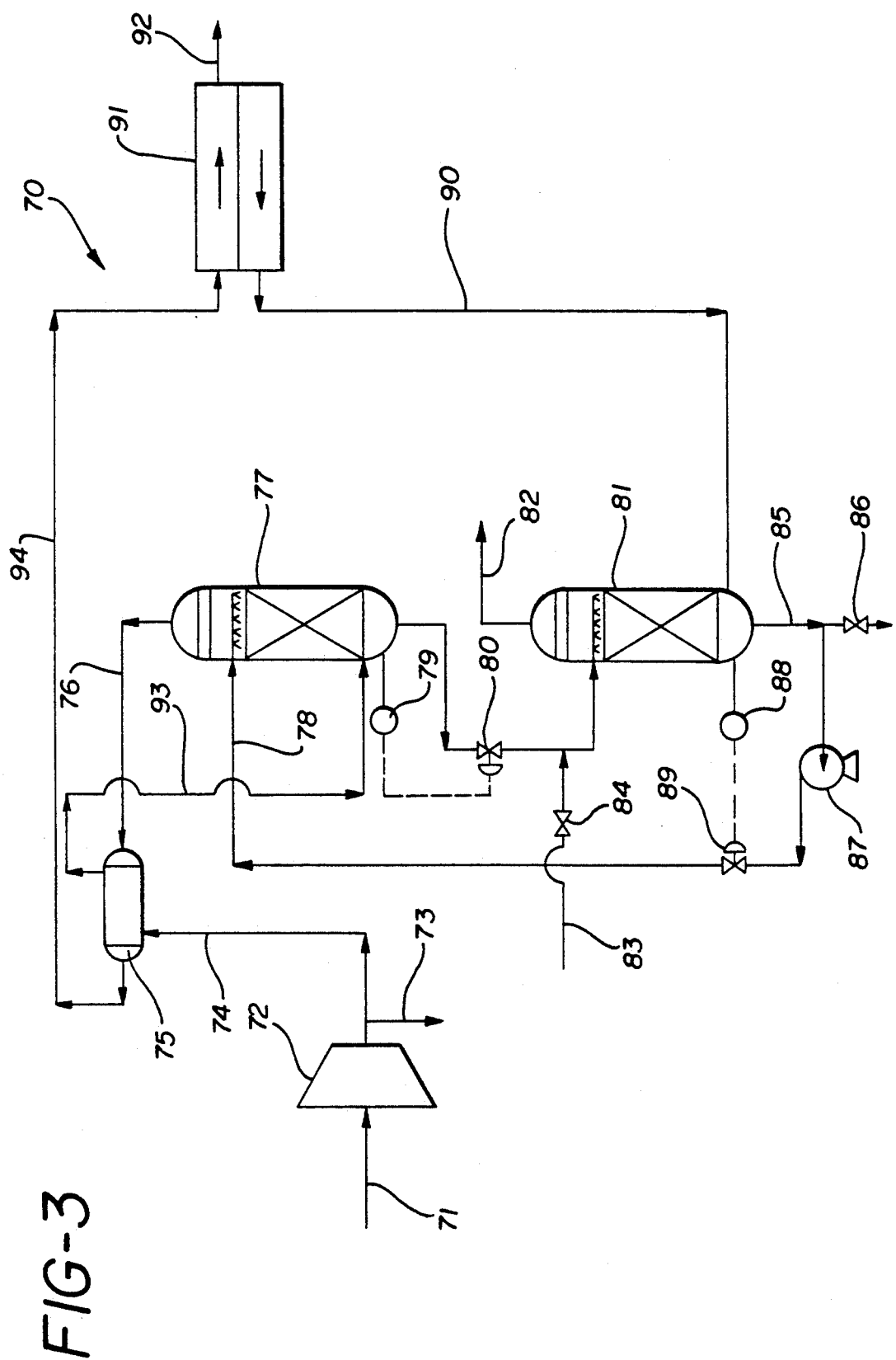
FIG. 3 is a schematic for a further embodiment of the present invention.

FIG. 3 depicts an embodiment of the present invention wherein a heat exchanger 75 is used to replace the electric heater 17 of FIG. 1. In this embodiment, a system 70 is provided, wherein the feed air 71 is passed through a compressor 72, followed by an aftercooler and coalescent filters, whereupon the condensate 73 is removed and the compressed feed gas 74 is passed to the heat exchanger 75. The feed gas 74 is cooled in the heat exchanger 75 by the cooled gas 76 exiting from a high-pressure column 77. The cooled gas 93 exiting the heat exchanger 75 then enters the high-pressure column 77 to be further cooled to provide substantially cooled gas 76 at its dewpoint. The high-pressure column 77 uses cooled water obtained from a low-pressure column 81, whereby cooled water 85 is passed through a pump 87 and a valve 89 to provide the cooled water 78 to the high-pressure cooling column 77. The water from the high-pressure cooling column 77, after having been used to cool the feed gas 93, exits the column and is passed through a valve 80 into a low-pressure cooling column 81. The low-pressure cooling column 81 is fed with a permeate stream 90. The effluent gas 82 from the cooling column can be used as a product or vented to the atmosphere. A valve 86 is provided to purge water and contaminants from the system. The temperature of the cooled gas 94 exiting the heat exchanger 75, which is above its dewpoint, is fed to a membrane separator unit 91, whereupon the cooled gas stream is separated into a product stream 92 and the permeate stream 90. In order to maintain the water inventory at the desired level in the system, make-up water is provided by a line 83 and is controlled by a valve 84. Level controllers 79 and 88 control the levels in the columns 77 and 81, respectively. This particular system has allowed replacement of an electric heater with a heat exchanger, thus reducing the electrical requirements for the system.

In the system depicted in FIG. 3, the high pressure cooling column can be replaced by a heat exchanger as shown in FIG. 2.

Figure 4:
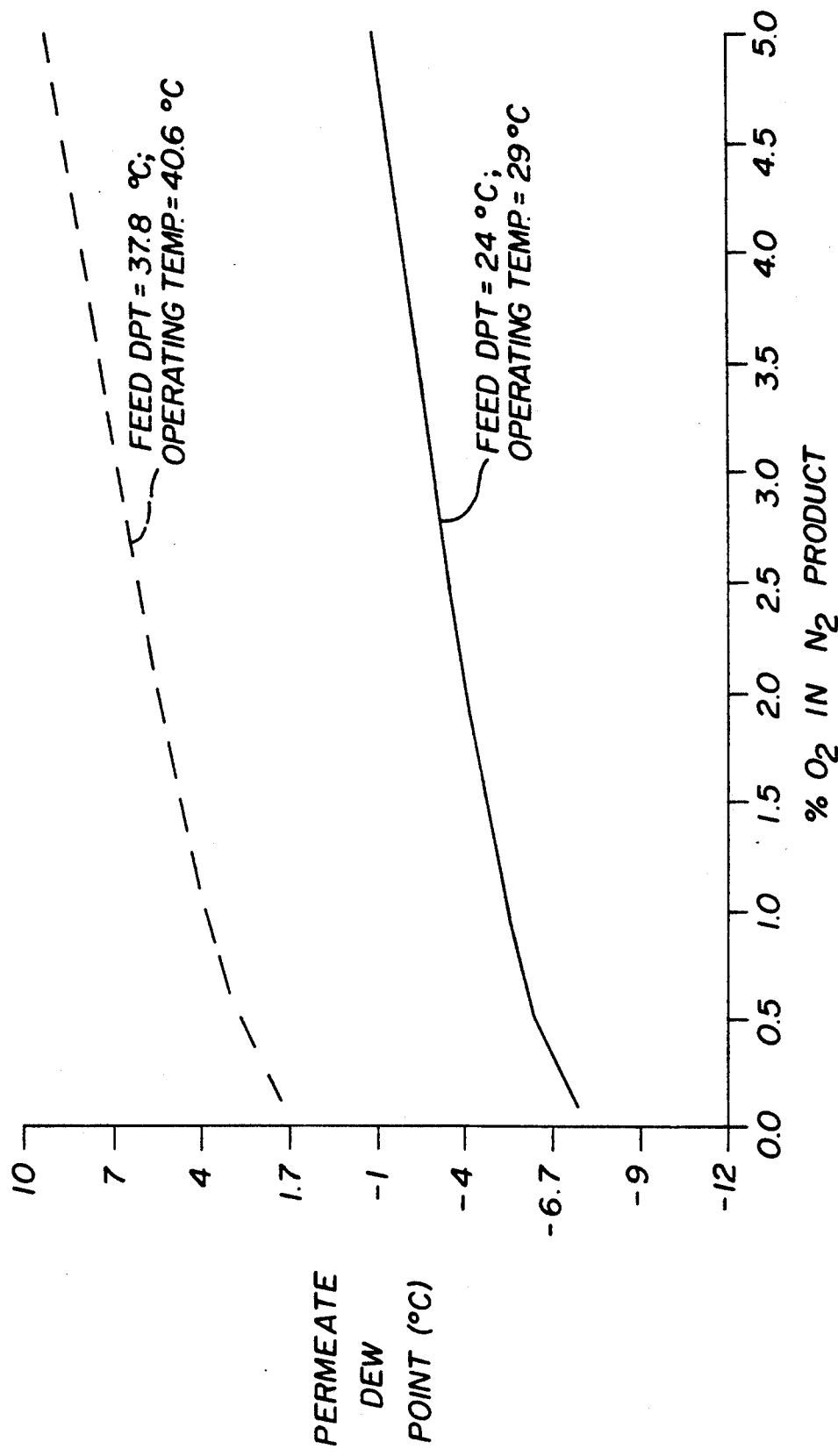
FIG. 4 is a graph depicting the permeate dewpoint relationship to the oxygen content in a nitrogen product.

The ability of the gas stream emanating from a gas separation membrane unit, to provide evaporative cooling of water primarily is dependent on the temperature and humidity of the stream. FIG. 4 demonstrates the membrane permeate dewpoints from a single-stage countercurrent membrane unit, which is receiving feed air at 11.4 bar, as a function of the purity of the nitrogen product. The selectivities used for the oxygen, nitrogen and water are shown in Table 1 below. These are typical of air separation membrane units.

TABLE 1

| Gas | Selectivity at 29° C. | Selectivity at 41° C. |
|---|---|---|
| Oxygen | 5.5 | 5.0 |
| Nitrogen | 1.0 | 1.0 |
| Water | 44.4 | 37.3 |

In FIG. 4, two curves are shown. The upper curve depicts the dewpoint of the permeate for a membrane feed at 38° C. at 11.4 bar. The membrane unit operates at 41° C. Permeate dewpoints, ranging from 1.71° C. to 9.4° C., are achievable over the purity range for nitrogen of 99.9% to 95%. These values correspond to wet bulb temperatures, ranging from 18.9° C. to 21° C. In the lower curve, the membrane is operated at 29° C., and receives air with a dewpoint of 24° C. at 11.4 bar. Membrane permeate dewpoints, ranging from −7.51° C. to −1.11° C., are achievable with corresponding wet bulb temperatures of 12.8°-13.9° C. The dewpoints of the corresponding non-permeate streams are typically less than −60° F.

Figure 5:
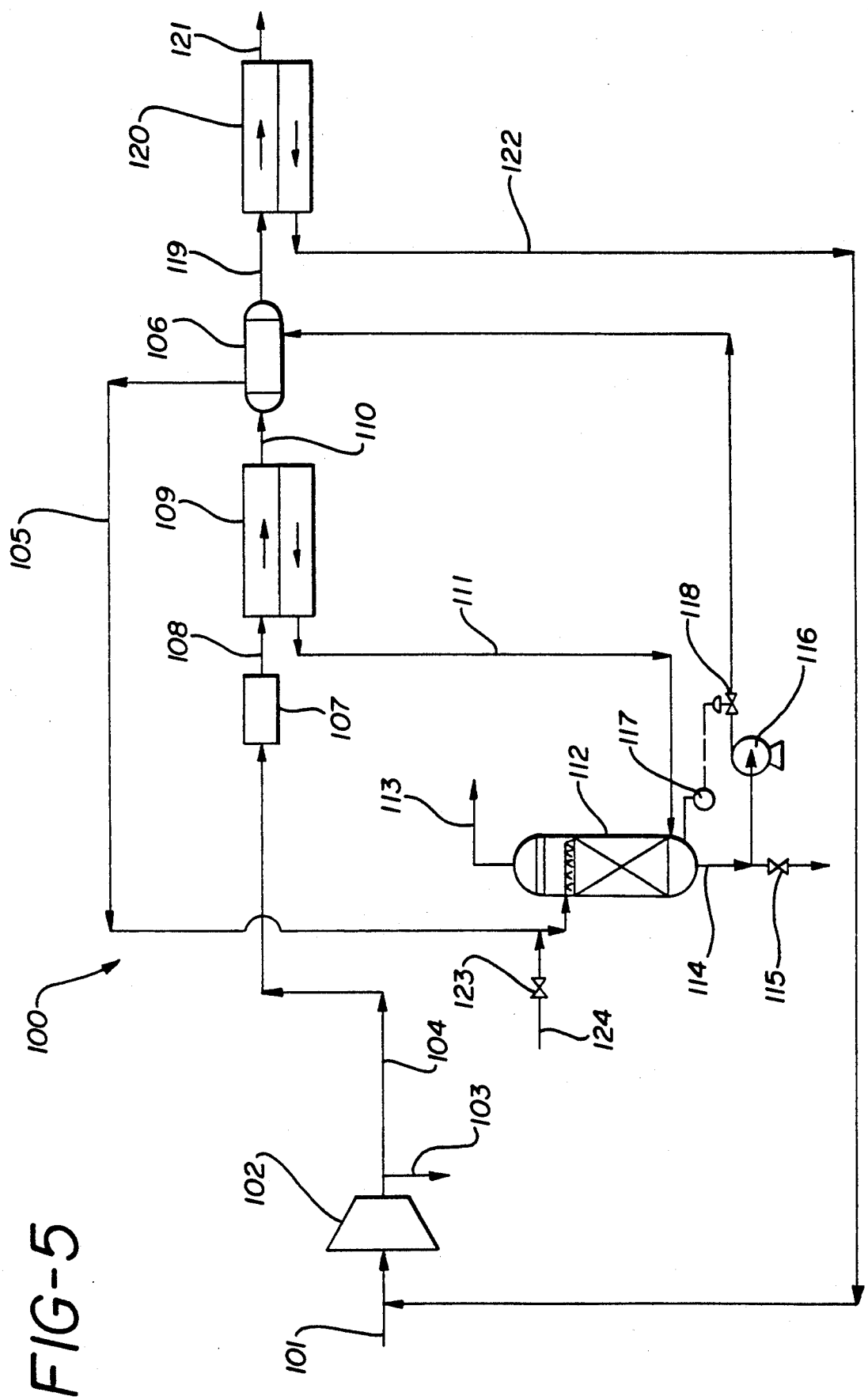
FIG. 5 is a schematic depicting a still further embodiment of the present invention.

FIG. 5 depicts a two-stage membrane system. Both units operate at 26.71° C., at which the selectivities of oxygen and water in relation to nitrogen are 5.7 and 46.5 respectively. The system 100 has air as a feed gas 101 to a compressor 102, which has an aftercooler and coalescing filters. A condensate 103 is discharged from the system. The feed gas 104 is heated by a heater 107, in order to raise the temperature of the feed above its dewpoint. The gas 108 is then separated in a membrane separation unit 109 to yield a non-permeate 110 and a permeate stream 111. The non-permeate stream 110 is passed through a cooler 106, and the cooled gas 119 is treated by a second membrane separation unit 120. The separation unit 120 provides a non-permeate gas product 121 and a permeate stream 122. The permeate stream 122 is recycled to the original feed gas. The permeate 111 from the membrane separation unit 109 is recycled to a cooling column 112. The cooling column 112 utilizes the low dewpoint permeate gas to provide a cooled water stream 114 by evaporation, which is pumped by a pump 116 through a valve 118 to the cooler 106. The cooled water 105 from the cooler is recycled back to the cooling column 112 which also has a blow-down valve 115. A make-up water source 124 supplies the necessary water through valve 123 to maintain a desirable water level in the cooling column 112. A level controller 117 maintains the proper level in the cooling column 112. The spent gas 113 is vented either to the atmosphere or recycled to another system. The second permeate stream 122 need not be recycled, but may be vented to the atmosphere or utilized in another process.

Figure 6:
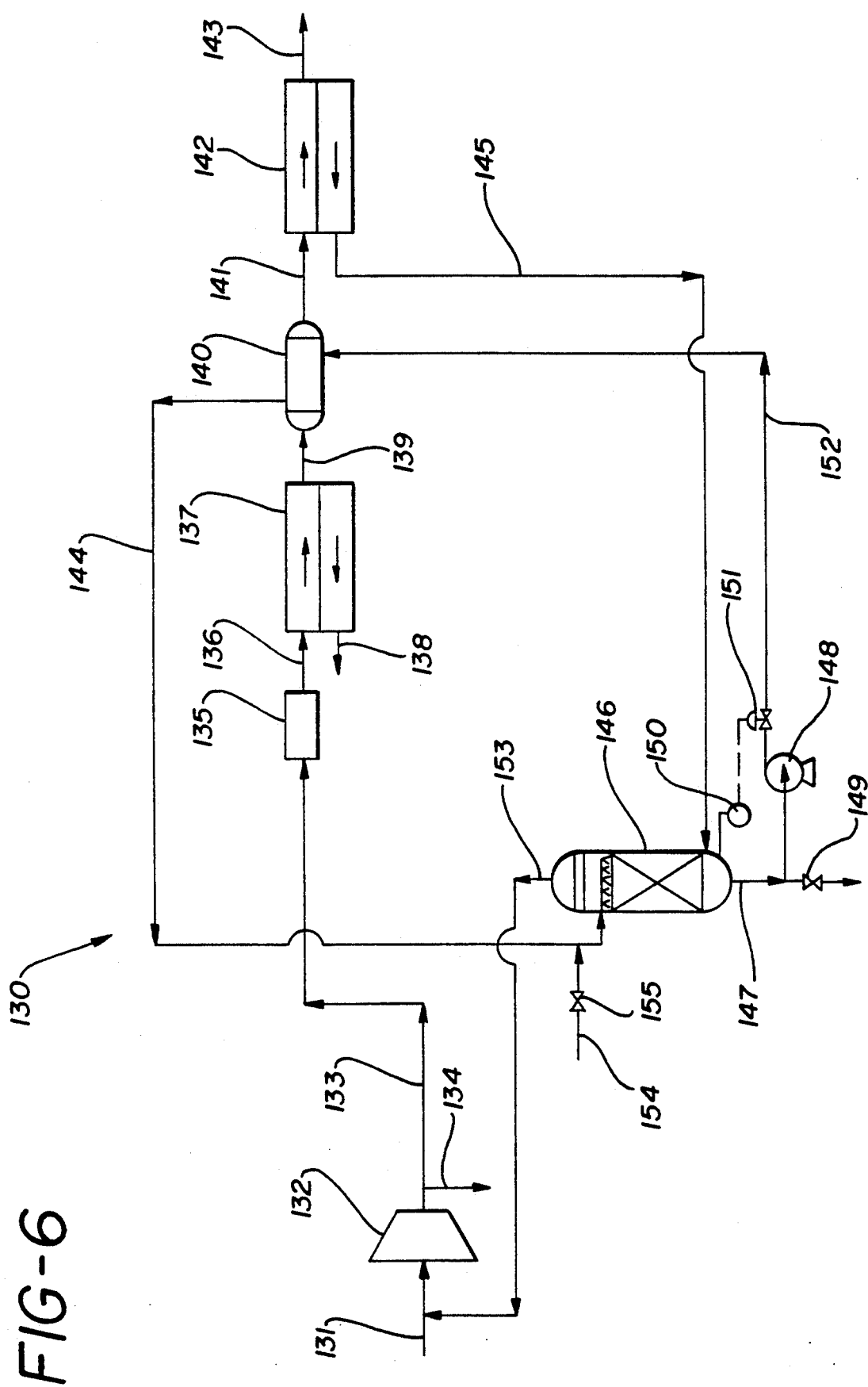
FIG. 6 is a schematic of another embodiment of the present invention.

Although FIG. 6 also depicts a two-stage membrane system 130, the permeate from the second stage 145 is recycled to the cooling column 146. This process is attractive because the permeate from the second stage 145 typically has a much lower dewpoint than that of the permeate from the first stage. In the system 130, a feed gas 131 is compressed in a compressor 132, whereafter the gas passes through an aftercooler and coalescing filters, condensate 134 is removed, and the cooled compressed feed gas 133 at its dewpoint is heated by a heater 135. The heated compressed feed gas 136 is then treated by a membrane separation unit 137 to produce a non-permeate product stream 139 and a permeate stream 138. The permeate 138 is used as product or vented into the air. The non-permeate 139 is then cooled in a cooler 140, and the resulting cooled compressed gas 141 is subjected to a second separation in a membrane separation unit 142. A non-permeate product 143 is a rich nitrogen gas. The permeate product 145 is recycled to a cooling column 146. The cooling column 146 discharges cooled water through a conduit 147 and to a pump 148, whereby the cooled water is pumped through a valve 151 and returned by a line 152 to the cooler 140. The column effluent gas 153 is recycled to the feed gas 131. The cooled water, after being used by the cooler 140, is then returned through a line 144 to the cooling column 146. A make-up water line 154, controlled by a valve 155, provides additional water to the cooling column as needed. The level control 150 controls the level of water in the column 146, and a blow-down valve 149 provides a means to purge water and contaminants.

Figure 7:
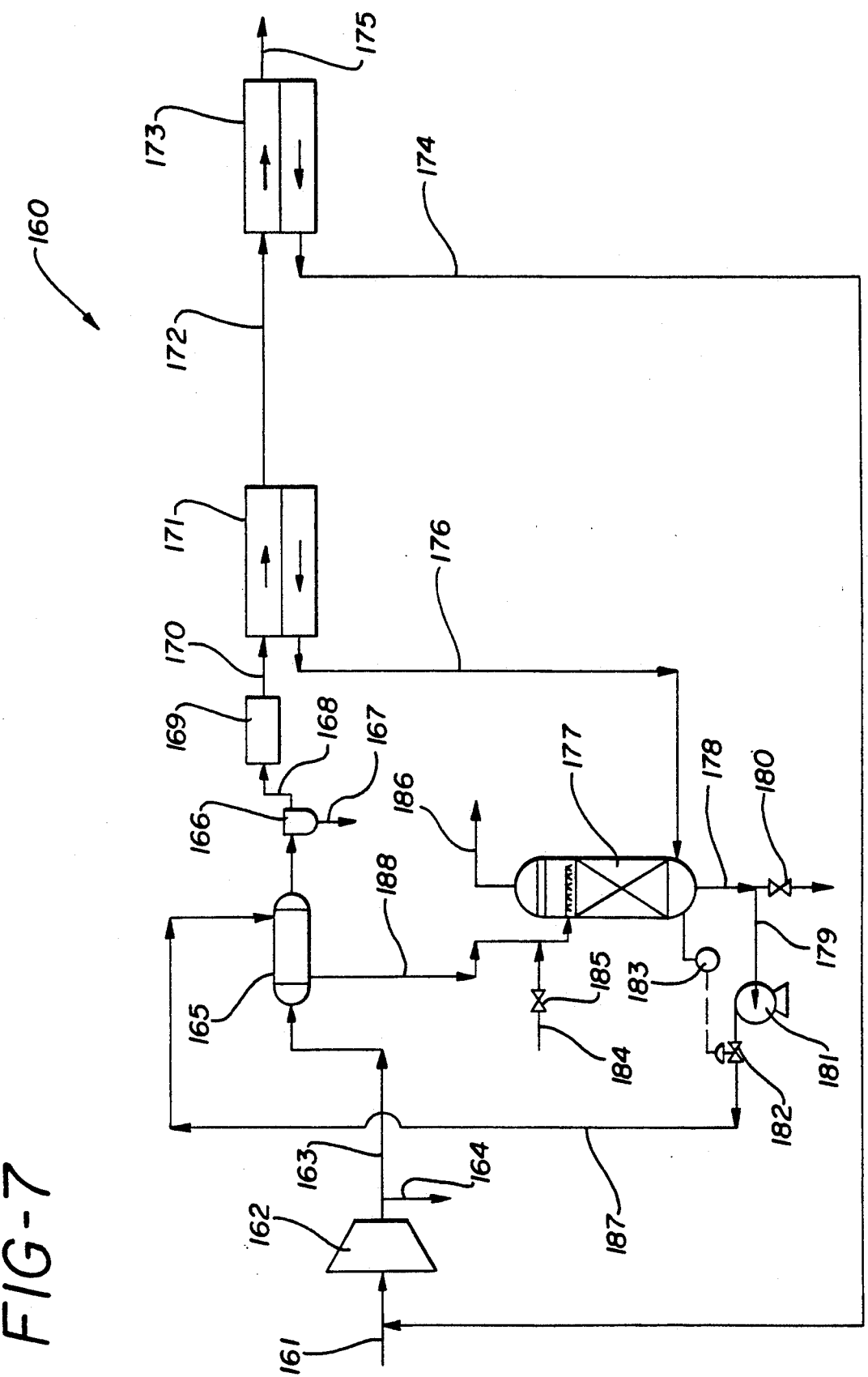
FIG. 7 is a schematic of a further embodiment of the present invention.

FIG. 7 depicts cooling the feed to the first gas separation membrane unit in the case of two membrane units. The system 160 is fed by air 161 to a compressor 162 with an aftercooler and coalescing filters. The condensates 164 are discharged, and the compressed feed 163 is cooled in a cooler 165. Condensates from the cooled gas are formed in a knock-out pot 166 and, are discharged through a line 167. The cooled feed 168 at its dewpoint is heated in a heater 169 to above its dewpoint. The heated gas 170 continues through a gas separation membrane unit 171, and is separated into two streams, a non-permeate stream 172 and a permeate stream 176. The non-permeate stream is passed to a second gas separation membrane unit 173, which also provides a non-permeate stream 175, which is the product stream, and a permeate stream 174, which is recycled and mixed with the fresh feed gas 161. In order to provide the cooled water, which cools the gas in the cooler 165, the first permeate stream 176 is recycled to a cooling column 177, wherein evaporative cooling of water takes place. The cooled water 178 is sent through a line 179, and is pumped by a pump 181 through a valve 182 and a line 187 back to the cooler 165. The cooler then recycles the cooled water 188 back to the evaporative cooler for recooling. A make-up water line 184 provides additional water through a valve 185 as needed. The effluent gas exits from the cooling column 177 through a line 186. A level control 183 is provided to maintain the proper water level in the cooling column. A blow-down valve 180 permits water, accumulated oils and other impurities, which come into the system, to be purged.

Figure 8:
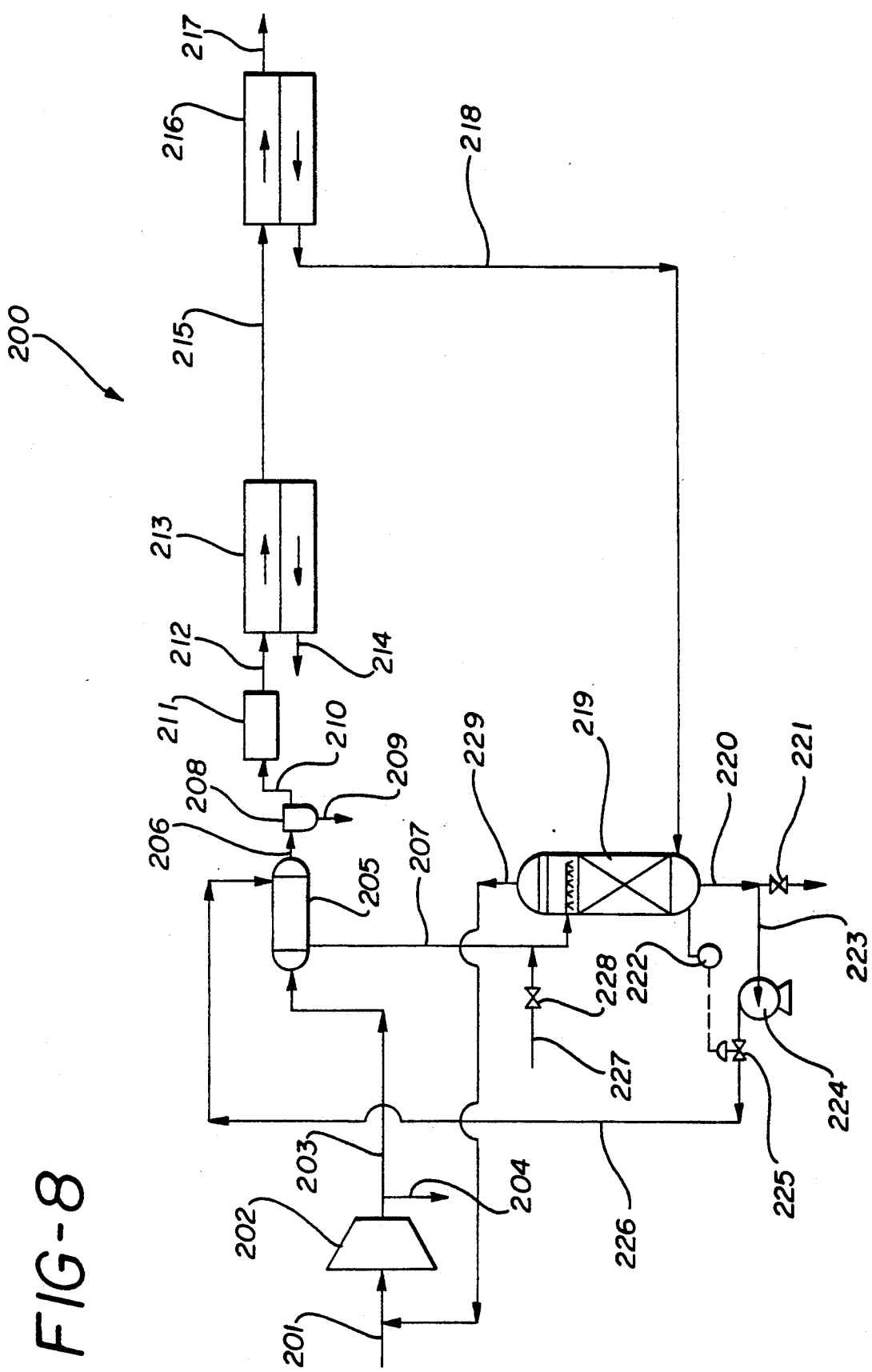
FIG. 8 is a schematic of a further embodiment of the present invention.

FIG. 8 depicts a system 200, whereupon the permeate from the second stage membrane unit provides the evaporative cooling gas, and the first stage permeate 214 is simply discharged from the system as a product or to the atmosphere. Specifically, a feed gas 201 is compressed in a compressor 202, which has an aftercooler and coalescing filters. The condensates 204 are discharged from the system, and the compressed gas 203 is sent to a cooler 205. The cooled gas 206 is then sent to a separator 208, whereupon the condensates 209 are separated from the gas and are discharged. The cooled gas 210 is heated in a heater 211, and then passed through a line 212 to a gas separation membrane unit 213. The membrane unit 213 separates the gas into two streams—the non-permeate stream 215 and a permeate stream 214. The permeate stream is discharged from the system. The non-permeate stream 215 is passed through a second gas separation membrane unit 216, whereupon two streams are formed. The non-permeate stream is the high nitrogen product stream 217. The permeate stream 218 is cycled to a cooling column 219. The cooling column sends cooled water through lines 220 and 223 to a pump 224, which pumps the cooled water through a valve 225 and a line 226 to the gas cooler 205. A level control 222 maintains the proper level in the cooling column 219. The gas 229 from the evaporative cooling column 219 is returned to the gas feed 201 of the system. The water from the gas cooler 205 is recycled to the cooling column 219 through a line 207. The cooling column 219 has a blow-down valve 221 to allow water and contaminates that accumulate in the system to be purged. A make-up water line 227 is controlled by a valve 228, whereupon water is provided to the cooling column in order to maintain the desired water inventory.

Figure 9:
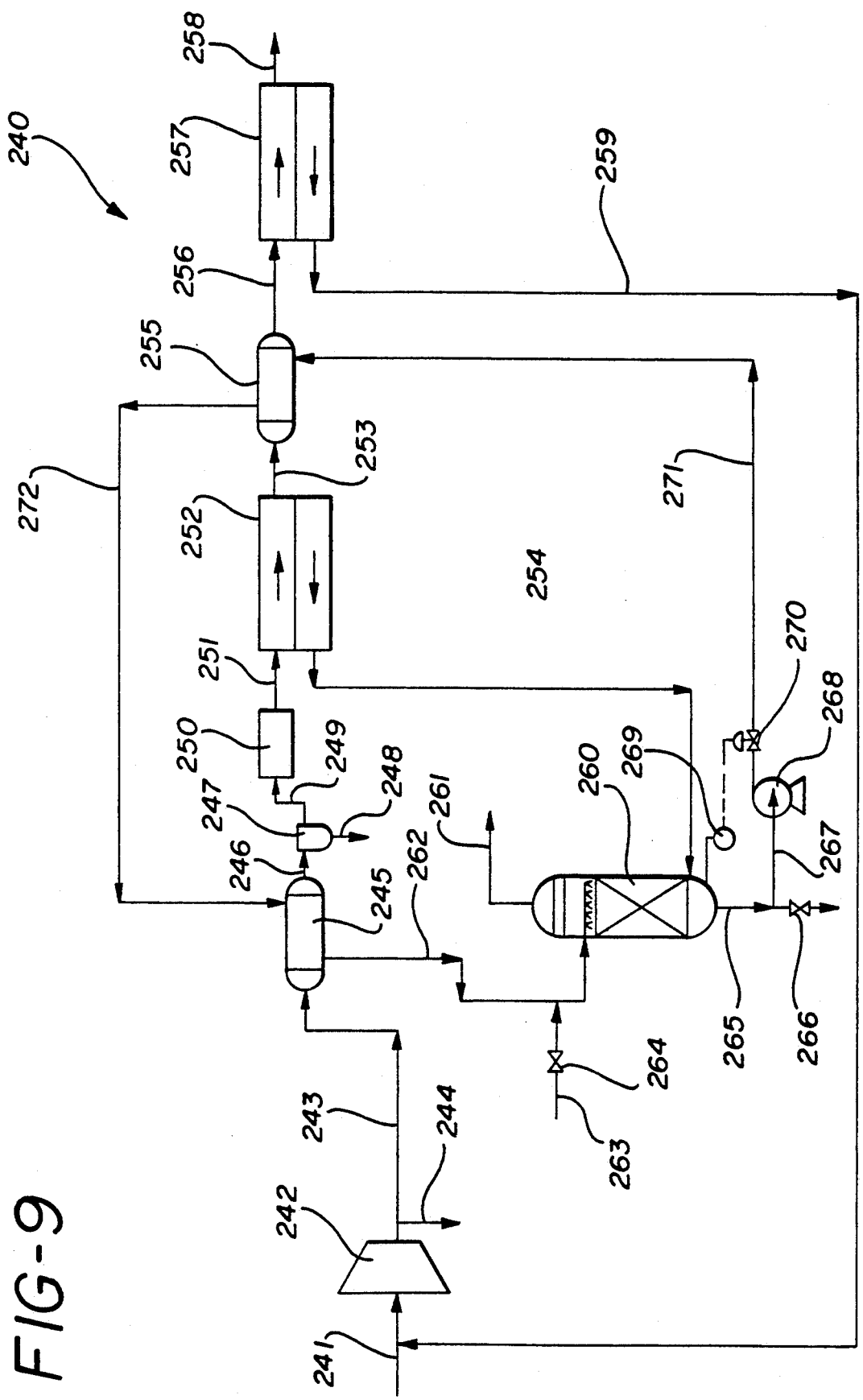
FIG. 9 is a schematic of another embodiment of the present invention.

FIG. 9 illustrates a system 240. A feed gas 241 is compressed in a compressor 242, which has an aftercooler and coalescing filters. Any condensate which is produced is discharged through a line 244. The compressed feed gas 243 is passed to a gas cooler 245. The cooled gas 246 at its dewpoint enters separator 247 to separate the condensate from the cooled gas. The condensate is discharged through a line 248. The cooled gas 249 is then heated to above its dewpoint in a heater 250. The slightly heated gas 251 is then passed through a gas separation membrane unit 252, whereupon two streams are formed. The permeate stream 254 is recycled to a cooling column 260. The cooling column by means of evaporative cooling utilizing the permeate 254 sends cooled water 265 through a line 267 to a pump 268, and the cooled water then proceeds through a valve 270 and a line 271 to a second gas cooler 255. A blow down valve 266 is provided to allow impurities to be purged from the system. The second gas cooler cools the non-permeate gas stream 253 from the membrane unit 252. The water 272 from the second gas cooler 255 is then passed to the first gas cooler 245, and then proceeds 262 to the cooling column 260. The cooled gas 256 proceeds to a second gas separation membrane unit 257, which separates the gas into two streams, the product stream 258 and a permeate stream 259. The permeate stream 259 which contains sufficient quantities of nitrogen to make the recycle advantageous for recovery of the nitrogen is recycled to the feed gas 241. The effluent gas from the cooling column 260 is discharged through line 261. A water make-up line 263 is controlled by a valve 264. The water make-up provides sufficient water to maintain the desired water inventory in the system.

Figure 10:
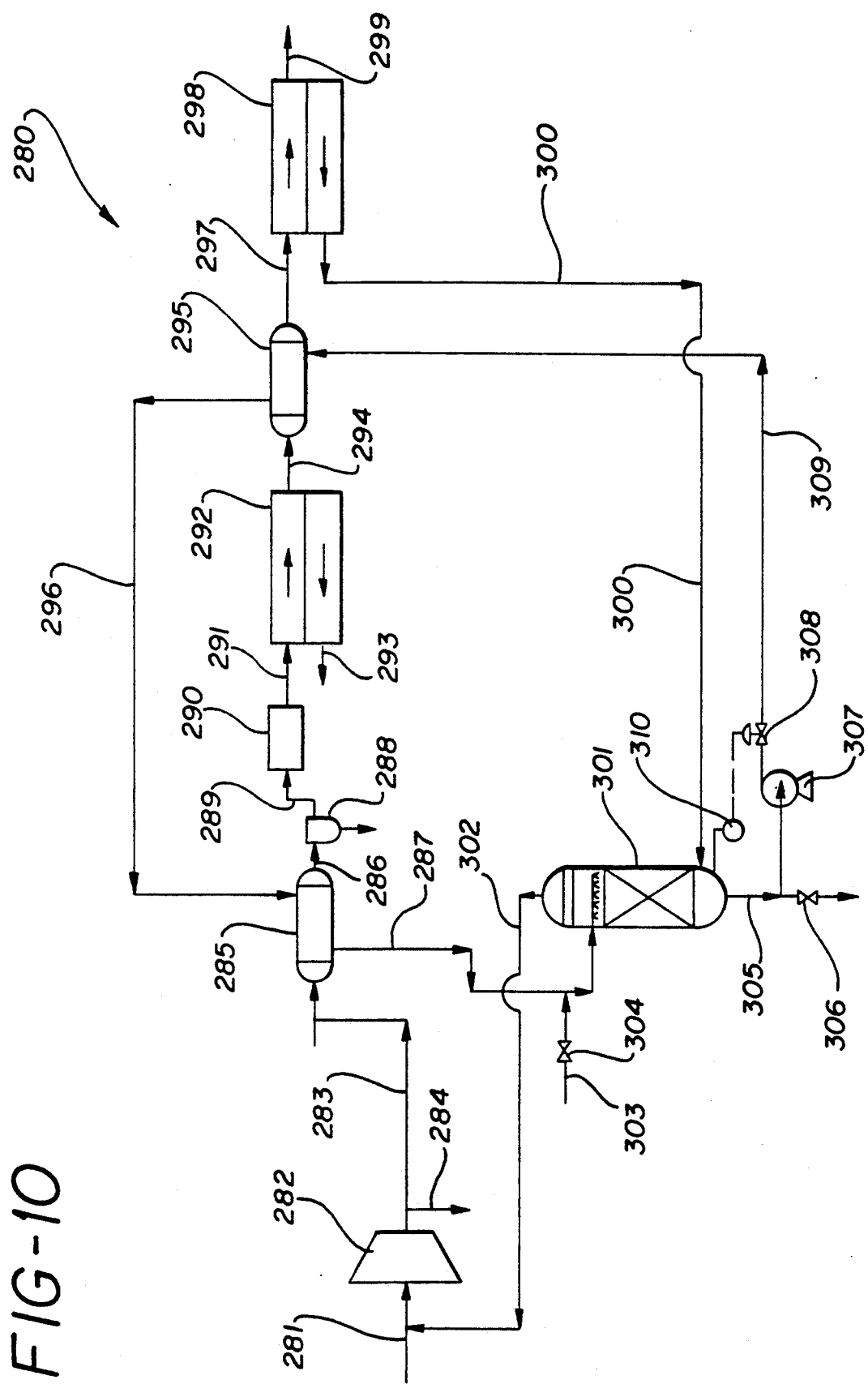
FIG. 10 is a schematic of a further embodiment of the present invention.

FIG. 10 illustrates a system 280 similar to that shown in FIG. 9, except that the permeate stream 300 from the second gas separation membrane unit 298 is recycled to the cooling column 301. Specifically, a feed gas 281 is compressed in a compressor 282, which has an aftercooler and coalescing filters. The condensates formed in the aftercooler are discharged through a line 284. The compressed feed gas 283 is introduced to a gas cooler 285. The cooled gas 286 at its dewpoint then proceeds to a separator 288, whereupon condensates are separated from the gas and discharged. The cooled gas 289 is heated to above its dewpoint in a heater 290. This slightly heated gas 291 is then passed to a gas separation membrane unit 292, whereupon two streams are formed. The permeate stream 293 is discharged from the system as a product or to the atmosphere. The non-permeate stream 294 is passed to a second gas cooler 295. After cooling, the cooled gas 297 is passed to a second gas separation membrane unit 298, whereupon two streams are formed. The product stream 299 is rich in nitrogen. The dewpoint of the permeate, stream 300 is very low and is used in a cooling column 301 to provide evaporative cooling of water, which is passed through a line 305 and cycled through a pump 307 and a valve 308 and a line 309 to the second gas cooler 295. After cooling the gas in the second cooler 295, the water 296 proceeds to the first gas cooler 285. After cooling the gas in the first cooler 285, the water proceeds through a line 287 back to the cooling column 301. The water level in the cooling column 301 is controlled by a level control 310. A water make-up line 303 provides water as needed to the system through a valve 304. A blow-down valve 306 is provided to allow impurities to be purged from the water system. The cooling column effluent gas is passed through a line 302 to return to the original gas feed 281. This system provides for optimal use of the permeate from the second gas separation unit for evaporative cooling purposes.

Figure 11:
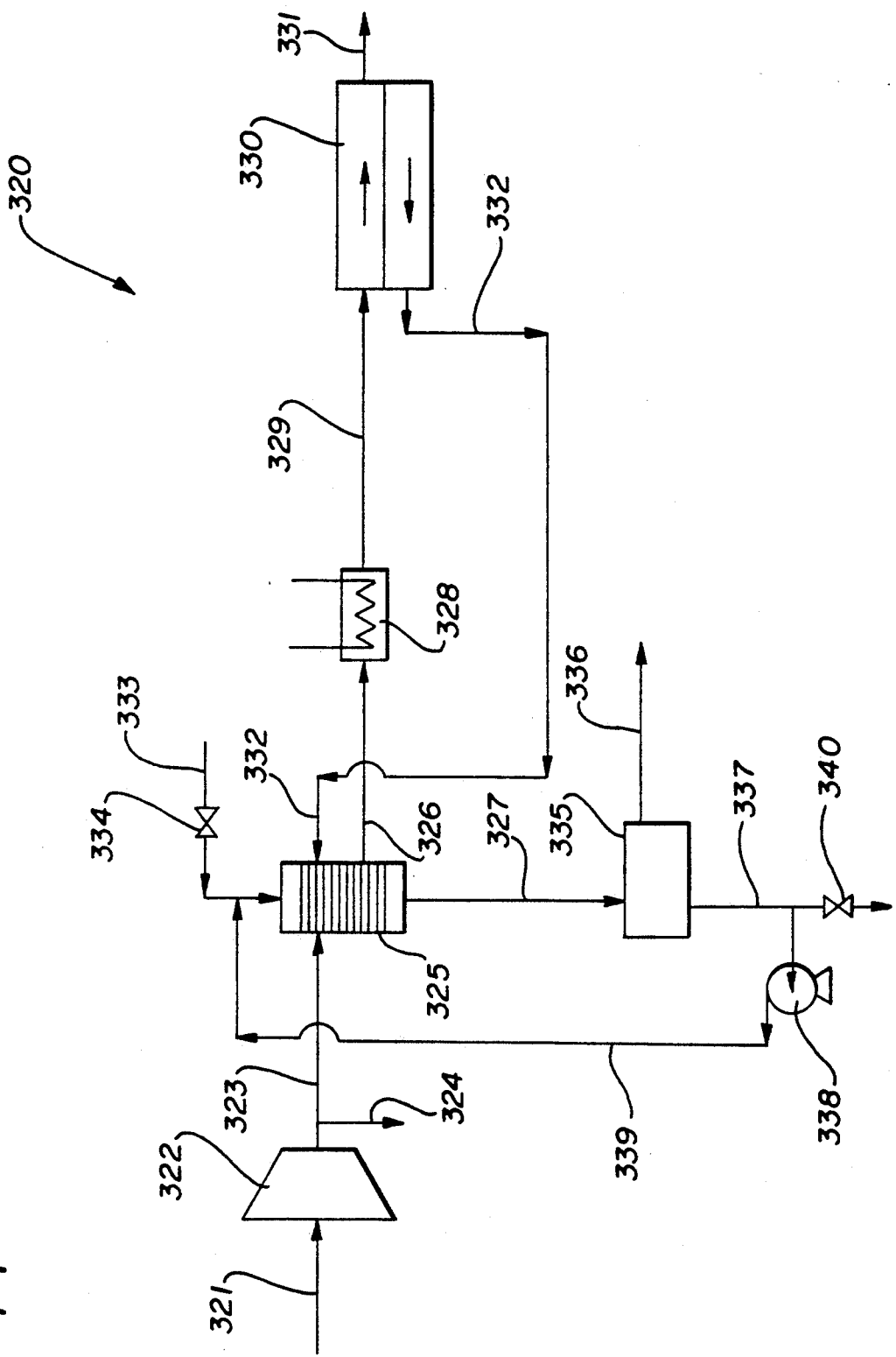
FIG. 11 is a schematic of a further embodiment of the present invention.

FIG. 11 illustrates a system 320 which is an alternative to the use of a packed column and heat exchange system as shown earlier, but instead provides a single unit operation, which allows simultaneous evaporative cooling of the water and cooling of the feed air by indirect contact with the cooled water. Specifically, a feed gas 321 is compressed in a compressor 322, which also includes an aftercooler and coalescing filters. The condensates formed in the aftercooler are discharged through a line 324. The compressed feed gas 323 is passed to a heat exchanger 325. The heat exchanger 325 is a finned tube heat exchanger. The cooled gas 326 is then passed to a heater 328 to heat the gas to above its dewpoint. The heated gas 329 is passed to a gas separation membrane unit 330, which forms two gas streams. The non-permeate stream 331 is a product stream. The permeate stream 332 is returned to the heat exchanger 325 where the permeate gas stream 332 is directed downward cocurrent with a water stream 333. Water is sprayed over the top of the tube bundle with excess water leaving the bottom of the heat exchanger 325. The contacting of the low dewpoint permeate gas 332 with the water 333 over the fins of the heat exchanger produces evaporative cooling with simultaneous heat transfer. The water 327 and waste gas, present in line 327, are separated in a vapor-liquid separator 335 with the gas being vented through a line 336 and the water recycled to the exchanger through a line 337 and a pump 338 in a line 339. The entry of water 333 to the system is controlled by a valve 334, and water purge from the system is controlled by valve 340.

Figure 12:
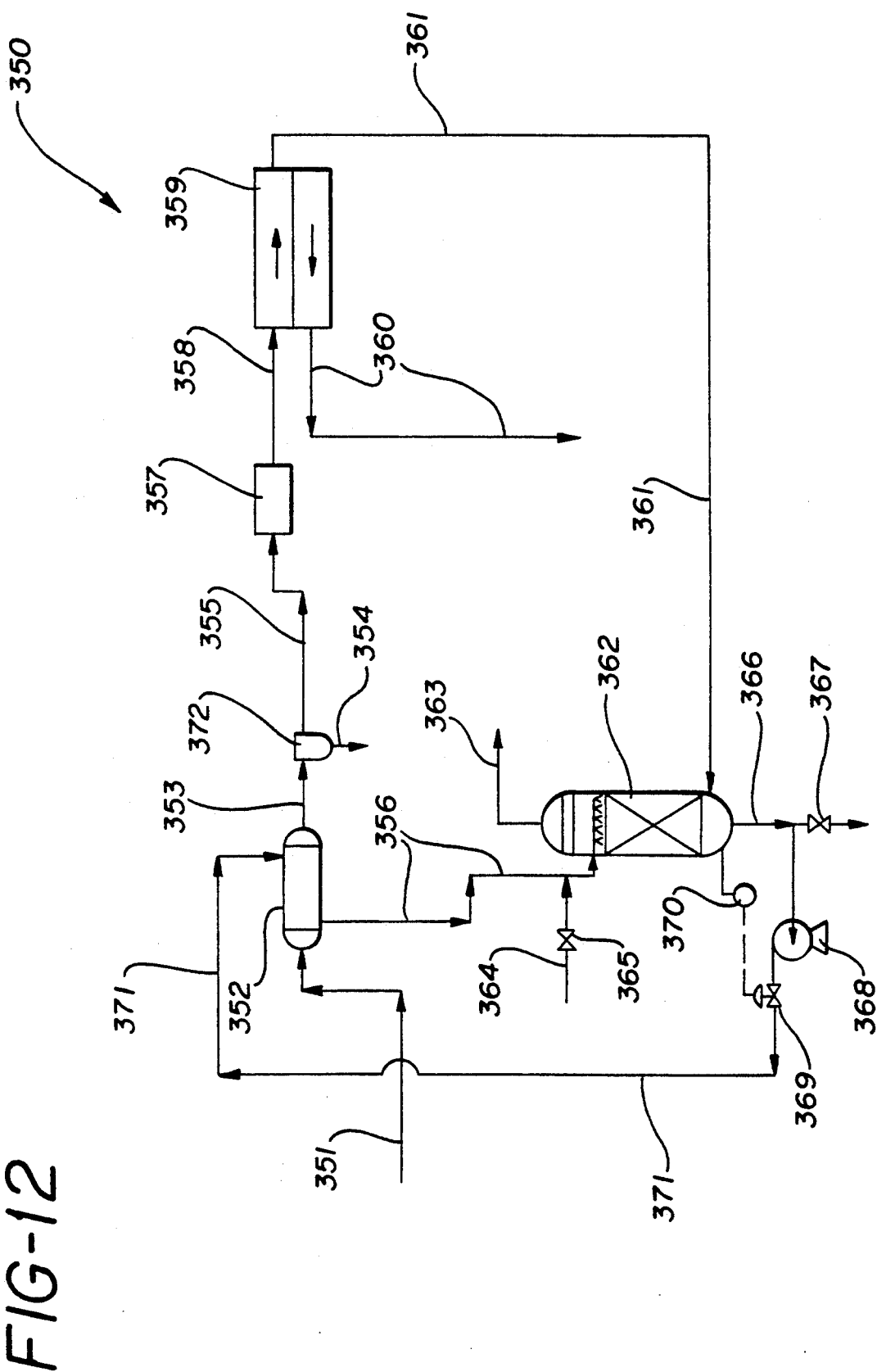
FIG. 12 is a schematic of a still further embodiment of the present invention.

FIG. 12 depicts a system 350 for obtaining an oxygen-enriched product. Air 351 from a blower is passed to a heat exchanger 352, which is cooled by water. The cooled gas 353 enters a separator 372, whereupon the condensates 354 are separated from gas and discharged from the system. The cooled gas 355 is heated in a heater 357 to temperature above its dewpoint. The slightly heated gas 358 is then subjected to separation in a gas separation membrane unit 359. The oxygen product is in the permeate stream 360, and is removed by vacuum pumps (not shown). The nitrogenrich non-permeate stream 361 has a low dewpoint. It is cycled to a cooling column 362. The cooling column cools water by evaporative cooling, and provides cooled water 366, which is sent through a pump 368 and a valve 369 in a line 371 to the heat exchanger 352. The cooled water, after passing through the heat exchanger 352, is returned to the cooling unit through a line 356. The cooling column gas effluent is discharged from the system through a line 363. A level control 370 controls the level of water in the cooling column 362. In order to provide for evaporation of water leaving the system, a make-up water line 364 is provided and provides water through a valve 365 to the cooling column 362. A blow-down valve 367 allows removal of contaminants from the cooling column 362. In this example, the feed blower could be replaced with a compressor so the membrane can be operated with higher feed-side pressures. Under these conditions, a vacuum can be employed on the permeate side or it can be eliminated.

The present invention cools the warm saturated air to a membrane unit by heat transfer to cold water, either directly, for instance, in a packed column, or indirectly, for example, in a heat exchanger. The cooled saturated air is then reheated by electrical means, indirectly with a hot fluid, such as steam, or heat exchange with the warm feed air or combinations thereof to a temperature slightly above its dewpoint temperature. The cold water, most generally, is provided by evaporative cooling of water with, for example, the low dewpoint membrane permeate in a suitable contacting device. This device may be a gas-liquid contacting tower or other softable cooling column, containing a suitable filling material to provide a large gas-liquid contact area. The water is continuously circulated between the air cooler (a high-pressure column) and the evaporative cooling device (a low-pressure column). A status of constancy is attained when the enthalpy removed from the feed air in the high-pressure column or heat exchanger is balanced by the enthalpy removed in the low-pressure column.

A further embodiment of the invention relies on water taken from a local water supply (e.g. cooling tower), which is further chilled by evaporative cooling with the membrane permeate or non-permeate. The chilled water is then used to cool the feed gas to the membrane through heat exchange with the feed gas. The water is then returned to the local water utility. The advantage of this embodiment is that no internal water recycle is used and, thus, contaminant buildup is avoided. Blow-down of the evaporative column is therefore unnecessary. This application is applicable to all of the systems discussed above, and is illustrated in FIG. 13 for the system described in FIG. 2.

Figure 13:
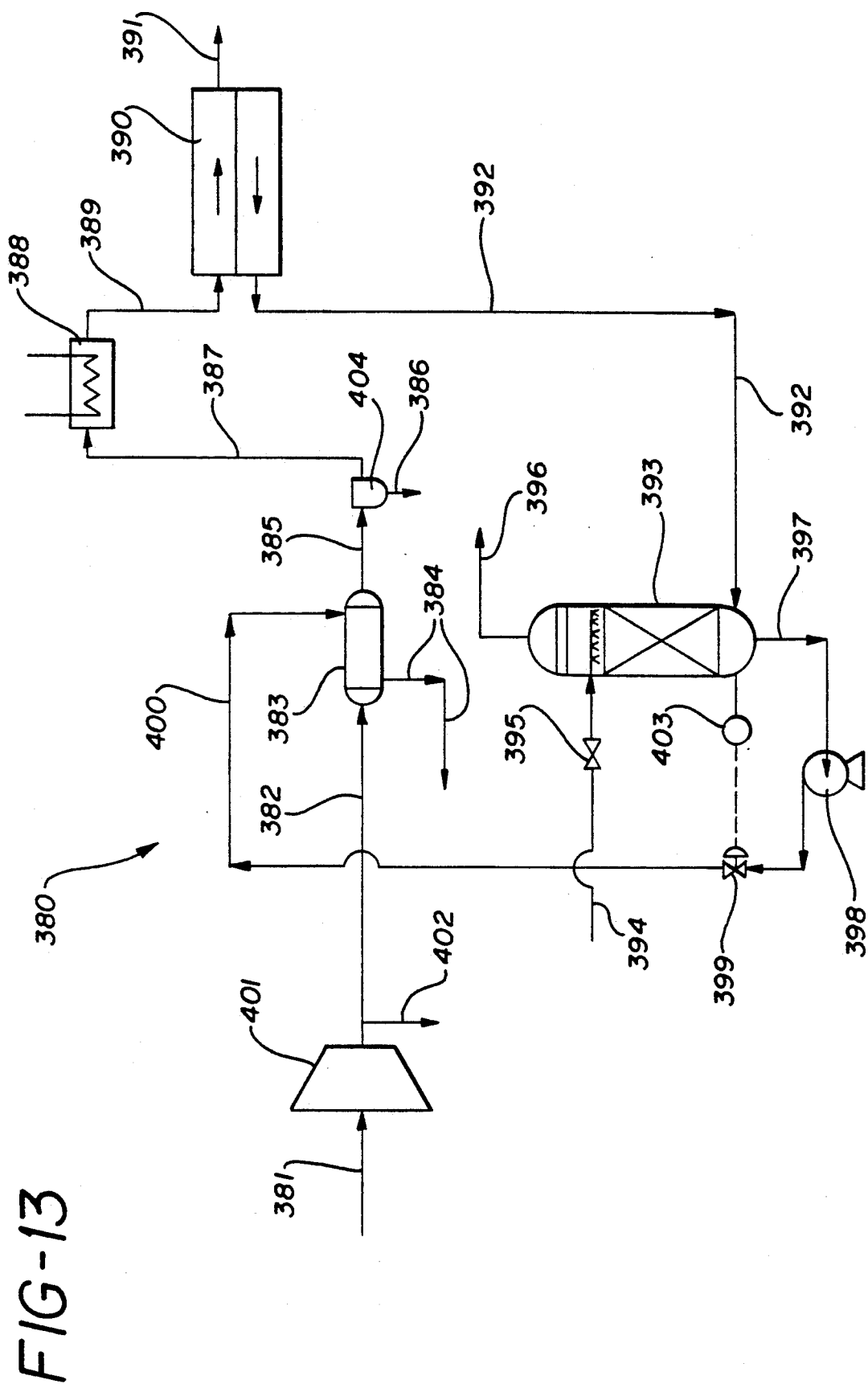
FIG. 13 is a schematic of another embodiment.

FIG. 13 illustrates a system 380 similar to the system 40 (FIG. 2) for cooling the feed air to a membrane unit except that the water is not recycled, but rather taken from and returned to a local utility. Specifically, air 381 is fed to a compressor 401 followed by separators and coalescers to remove moisture and oil in condensate 402. The compressed air stream 382 then passes through a heat exchanger 383, which cools the air stream by heat exchange with cooling water 400, and from which water 384, heated by the air, is removed and returned to a local cooling water supply (e.g. plant cooling tower). Cooling water 394, supplied from the local cooling water supply and controlled by a valve 395, is further chilled by an evaporating column 393 to produce a cold water stream 397, pumped with a pump 398 and returned to the heat exchanger 383 through a conduit 400. A control valve 399 controls the flow of water, and is operated by a level control 403, which maintains the correct level in column 393. In contrast to system 40, a blow-down is not required since the water is not recirculated. The permeate gas stream 396 is either recovered or vented to the atmosphere. Cooled air 385 exiting the heat exchanger 383 enters a separator 404, and a condensate 386 is removed. The air leaves the separator through a conduit 387, and enters a heater 388 where it is heated to approximately 3° C. above the dewpoint of the air. The heated gas 389 then enters a membrane unit 390, which separates the gas into a non-permeate stream 391 and a permeate stream 392. The low dewpoint permeate stream 392 is then fed to a low-pressure column 393 for the evaporative cooling of a water stream 394.

Figure 14:
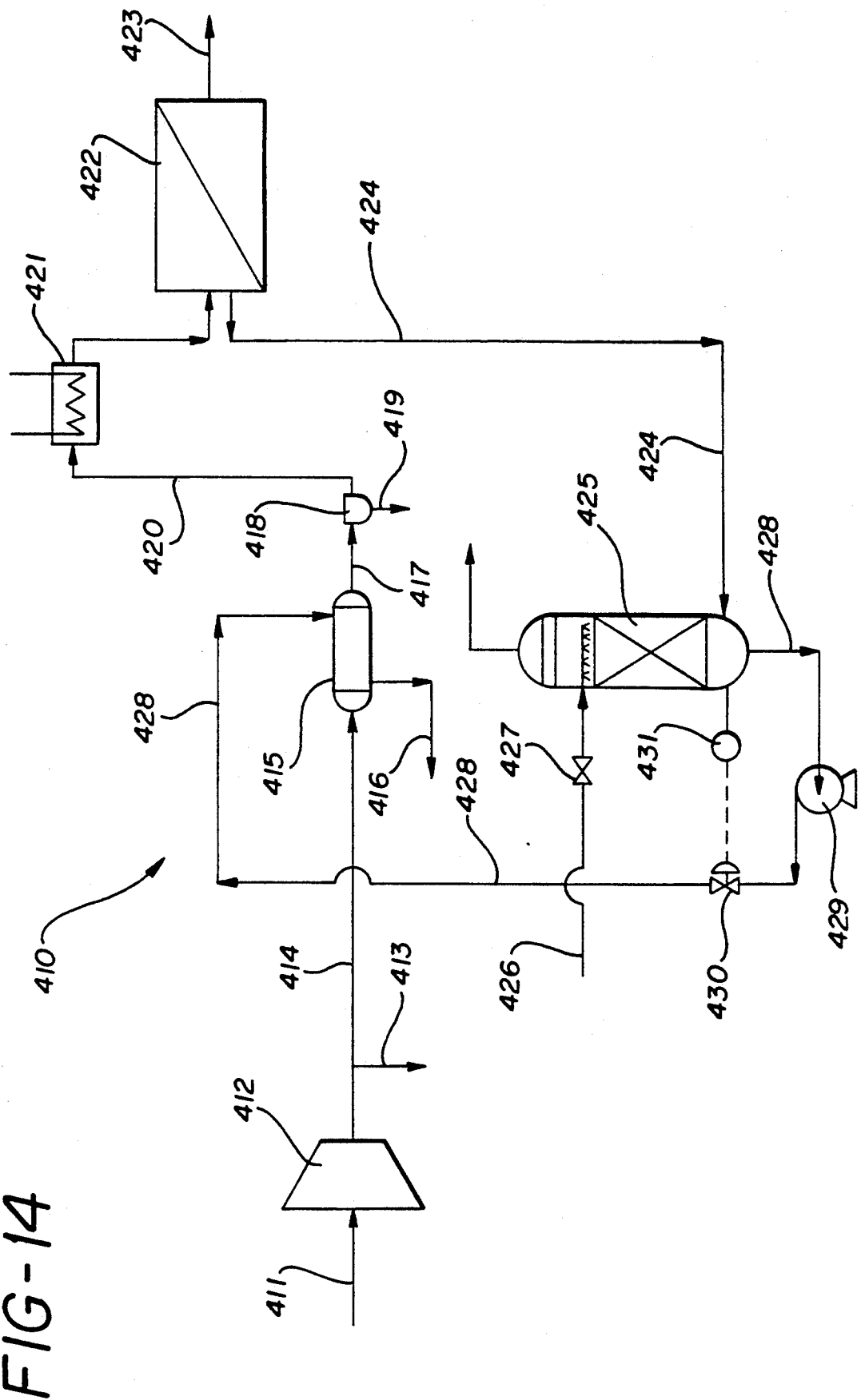
FIG. 14 is a schematic of a further embodiment.

FIG. 14 depicts a system 410 similar to the system in FIG. 13 except that the separation unit is a pressure-swing adsorption unit. Specifically, air 411 is fed to a compressor 412, which includes separators and coalescing filters to remove moisture and oil resulting in a condensate 413. The compressed air stream 414 passes through a heat exchanger 415, which cools the air stream by heat exchange with cooling water 428. The cooling water then exits at line 416, and is returned to a local cooling water supply. The cooling water 426, supplied from the local cooling water supply, is controlled by a valve 427, and is further chilled by an evaporating column 425 to produce a cold water stream 428. The cold water stream 428 is pumped via a pump 429, and returned to the heat exchanger 415 through a conduit 428. A control valve 430 controls the flow of water, and is governed by a level control 431, which maintains the correct water level in the cooling column 425. The cooled air 417, leaving the heat exchanger 415, is passed through a separator 418, which condenses any water and separates the water providing condensates which are ejected from the system at a line 419. The cooled air 420 then enters a heater 421 to raise the temperature to a few degrees above the dewpoint of the air. The heated air then enters a pressure-swing adsorption unit which separates the gas into a high-pressure stream 423 containing primarily nitrogen and a low-pressure stream 424 enriched in oxygen. The lowpressure stream is then fed to a low-pressure column 425 so as to provide by evaporative cooling a water stream 428. In this case, the molecular sieve is a carbon sieve, which adsorbs the oxygen, and allows the nitrogen to pass through. A zeolite adsorbent bed can be used whereby the nitrogen is adsorbed and the oxygen becomes the high-pressure stream.

EXAMPLE 1

This example follows the scheme set forth in FIG. 2. Air, having a pressure of 1 bar at a temperature of 23.9° C. with a dewpoint of 15.61° C., is passed to a compressor at the rate of 49,330 scf/h (standard cubic feet/hour). After the air has been compressed and passed through the aftercooler and the coalescing filters, saturated air 43 has a pressure of 11.4 bar at 35° C., and enters the gas cooler 44 at a rate of 48,720 scf/h. The temperature of the water used in the cooler is 18.1° C. After passing through the gas cooler and a separator 64, the compressed air 46 is at a pressure of 11.3 bar and a temperature of 23.6° C. with a dewpoint of 23.6° C. The air is passed to a heater 47, and exits the heater at a pressure of $-11.0$ bar and a temperature of 29.4° C., with a dewpoint of 23.2° C. The air is then transported to a membrane separator 49 where a non-permeate stream 50 is formed at a pressure of 10.7 bar, a temperature of 29.4° C., and a dewpoint of $-101.7°$ C. The nitrogen product is produced at 15,000 scf/h containing 1% oxygen. The permeate stream 51 exits the membrane separator 49, having a pressure of 1 bar at 29.4° C. with a dewpoint of $-4.9°$ C., at a rate of 33,600 scf/h. The stream contains 29.8% oxygen. This stream 51 is passed to a cooling column 52, whereupon the gas cools the water 58, entering the cooling column 52 at a temperature of 22.8° C. and at a rate of 6.1 gallons per minute. The water is cooled, and exits the cooler at 59 at a temperature of 18.1° C., and at a rate of 6.1 gallons per minute. This water is then circulated to the gas cooler 44.

This example illustrates the ability to produce 15,000 standard cubic feet per hour of 99% pure nitrogen by use of a single membrane unit. This is achieved by lowering the temperature of the gas entering the separator from 46° C. to 29.4° C.

Thus, the utilization of the cooled, low dewpoint permeate gas stream to cool water by evaporation allows an efficient utilization of membrane separators to provide large quantities of high purity nitrogen gas.

EXAMPLE 2

This example illustrates the difference in power consumption for providing 10,000 standard cubic feet per minute of nitrogen at a purity of 99% from a membrane system. The controlling factor in this example is the membrane temperature. The pressure is held constant at 200 psi in examples A and B. In example A, a typical membrane temperature of 46.1° C. is used. This temperature is generally achievable with standard air or water cooled after coolers in moderate climates, and where a heater is used to raise the feed gas a few degrees above its dewpoint prior to entering the membrane unit. In situation B, the temperature of the gas entering the membrane unit is 18.3° C. In each instance, the nitrogen purity is 99%, and the flow of nitrogen exiting the system as product is 10,000 scf/h. In Table 2 below, the data are presented for the amount of air flow required as well as the percent of nitrogen recovered (defined as the nitrogen product flow divided by the air feed multiplied by 100) and the total power required. In situation B, the present invention, as illustrated in FIG. 2, was used. It should be noted that a reduction in temperature below 46.1° C. for the air being fed to the membrane separation unit allows a higher recovery of nitrogen at a lower power utilization. The power consumed by the cooling system is about 0.2 kw for the water circulation pump. Alternatively, cooling the feed gas leaving the compressor aftercooler with a refrigerated dryer would require about 4 kw to lower the temperature to 18.3° C.

TABLE 2

|  | A | B |
|---|---|---|
| Pressure. bar | 13.8 | 13.8 |
| Membrane Temperature, °C. | 46.1 | 18.3 |
| $N_2$ Purity, % | 99.00 | 99.00 |
| $N_2$ Recovery, % | 28.17 | 35.76 |
| $N_2$ Flow, scf/hr | 10,000 | 10,000 |
| Feed Air Flow, scf/hr | 35,000 | 27,964 |
| Total Power kw | 182 | 136 |

EXAMPLE 3

This example follows the scheme shown in FIG. 2 as applied to the drying and cooling of a natural gas stream. Natural gas, saturated with water at 70 bar and 45° C. is fed to the cooler 44 at a rate of 1 M MSCF/day. The temperature of the water used in the cooler is 25° C. After passing through the cooler and a condenser 64, the natural gas 46 is at 70 bar and 30° C. and contains 870 ppm water. In this example, a feed heater is not used since the feed to the membrane unit is above its critical pressure; i.e. condensation should not occur if the feed gas temperature decreases in the piping to the membrane unit. The natural gas is fed to a membrane separator 49 where a non-permeate stream 50 is formed at 69.5 bar containing 5 ppm water. The permeate stream exits the membrane separator 49 at 1 bar and 30° C. with a dewpoint of −4° C. This gas stream is fed to a cooling column 52 to cool water by evaporation. The water 58 enters the column 52 at 43° C. at a rate of 460 kg/hr. The water is cooled to 25° C. and recirculated to cooler 44. A makeup water flow rate of 12.5 kg/hr is needed to replace the water removed by evaporation in column 52. The gas waste stream leaving the cooling column can be compressed and mixed with the feed to minimize methane losses, or the stream can be flared.

We claim:

1. An improved process for the separation of at least one gas of a feed gas mixture from at least one other gas in the feed gas mixture by utilizing a gas separation unit to produce a high pressure stream and a low pressure stream, the improvement which comprises utilizing one stream from the gas separation unit to cool water by evaporation, cooling the feed gas mixture by direct or indirect contact with the cooled water, and recovering the other stream enriched in the at least one gas.

2. The process of claim 1 wherein the water is cooled by evaporation in a packed column.

3. The process of claim 1 wherein the water is cooled in a spray tower.

4. The process of claim 1 wherein the feed gas mixture is cooled by direct contact with the cooled water in a packed column.

5. The process of claim 1 wherein the feed gas mixture is cooled by direct contact with the cooled water in a spray tower.

6. The process of claim 1 wherein the feed gas mixture is cooled by indirect contact with the cooled water in a water-gas heat exchanger.

7. The process of claim 1 wherein the cooled water is recycled between a water cooler and a feed gas cooler.

8. The process of claim 7 wherein the cooled water is supplied from a cooling tower, chilled in the water cooler, used to cool the feed gas mixture, and returned to the cooling tower.

9. The process of claim 1 wherein the feed gas mixture is air.

10. The process of claim 1 wherein the gas separation unit is a membrane gas separation unit.

11. The process of claim 1 wherein the gas separation unit is a pressure swing adsorption unit.

12. The process of claim 11 wherein the pressure swing adsorption unit utilizes carbon molecular sieves.

13. The process of claim 11 wherein the pressure swing adsorption unit utilizes zeolite.

14. A process for the separation of at least one gas of a feed gas mixture from at least one other gas in the feed gas mixture by selective permeation utilizing two membrane gas separation units in series, wherein a nonpermeate stream from the first membrane unit is fed to the second membrane unit, and a permeate stream from the first membrane unit is used to cool water by evaporation.

15. The process of claim 14 wherein the cooled water is used to cool the feed gas mixture by direct or indirect contact.

16. The process of claim 14 wherein the cooled water is used to cool the nonpermeate stream by direct or indirect contact.

17. The process of claim 14 wherein a permeate stream from the second membrane unit is recycled to the feed gas mixture to the first membrane unit.

18. The process of claim 14 wherein the water is cooled by evaporation in a packed column.

19. The process of claim 14 wherein the water is cooled in a spray tower.

20. The process of claim 14 wherein the feed gas mixture is cooled by direct contact with the cooled water in a packed column.

21. The process of claim 14 wherein the feed gas mixture is cooled by direct contact with the cooled water in a spray tower.

22. The process of claim 14 wherein the feed gas mixture is cooled by indirect contact with the cooled water in a water-gas heat exchanger.

23. The process of claim 14 wherein the cooled water is recycled between a water cooler and a feed gas cooler.

24. The process of claim 23 wherein the cooled water is supplied from a cooling tower, chilled in the water cooler used to cool the feed gas mixture and returned to the cooling tower.

25. The process of claim 14 wherein the feed gas mixture is air.

26. A process for the separation of at least one gas of a feed gas mixture from at least one other gas in the feed gas mixture by selective permeation utilizing a first membrane unit and a second membrane unit in series, wherein a non-permeate stream from the first membrane unit is fed to the second membrane unit, and a permeate stream from the second membrane unit is used to cool water by evaporation in a water evaporation unit.

27. The process of claim 26 wherein the cooled water is used to cool the feed gas mixture by direct or indirect contact.

28. The process of claim 26 wherein the cooled water is used to cool the non-permeate stream leaving the first membrane unit by direct or indirect contact.

29. The process of claim 26 wherein the permeate stream leaving the water evaporation unit is recycled and mixed with the feed gas mixture to the first membrane unit.

30. The process of claim 26 wherein the water evaporation unit is a packed column.

31. The process of claim 26 wherein the water evaporation unit is a spray tower.

32. The process of claim 26 wherein the feed gas mixture is cooled by direct contact with the cooled water in a packed column.

33. The process of claim 26 wherein the feed gas mixture is cooled by direct contact with the cooled water in a spray tower.

34. The process of claim 26 wherein the feed gas mixture is cooled by indirect contact with the cooled water in a water-gas heat exchanger.

35. The process of claim 26 wherein the cooled water is recycled between the water evaporation unit and a feed gas cooler.

36. The process of claim 35 wherein the water is supplied from a cooling tower, chilled in the water evaporation unit, used to cool the feed gas mixture, and returned to the cooling tower.

37. The process of claim 26 wherein the feed gas mixture is air.

38. A process for the separation of at least one gas of a feed gas mixture from at least one other gas in the feed gas mixture by selective permeation utilizing a first membrane separation unit and a second membrane unit, wherein a non-permeate stream from the first membrane unit is fed to the second membrane unit, and a non-permeate stream from the second membrane unit is used to cool water by evaporation in a water evaporation unit.

39. The process of claim 38 wherein the cooled water is used to cool the feed gas mixture by direct or indirect contact.

40. The process of claim 38 wherein the cooled water is used to cool the non-permeate stream leaving the first membrane unit by direct or indirect contact.

41. The process of claim 38 wherein a permeate stream from the second membrane unit is recycled and mixed with the feed gas mixture to the first membrane unit.

42. The process of claim 38 wherein the water is cooled by evaporation in a packed column.

43. The process of claim 38 wherein the water is cooled in a spray tower.

44. The process of claim 38 wherein the feed gas mixture is cooled by direct contact with the cooled water in a packed column.

45. The process of claim 38 wherein the feed gas mixture is cooled by direct contact with the cooled water in a spray tower.

46. The process of claim 38 wherein the feed gas mixture is cooled by indirect contact with the cooled water in a water-gas heat exchanger.

47. The process of claim 38 wherein the water is recycled between the water evaporation unit and a feed gas cooler.

48. The process of claim 38 wherein the water is supplied from a cooling tower, chilled in the water evaporation unit used to cool the feed gas mixture, and returned to the cooling tower.

49. The process of claim 38 wherein the feed gas mixture is air.

* * * * *